United States Patent
Machac, Jr. et al.

(10) Patent No.: US 6,548,464 B1
(45) Date of Patent: Apr. 15, 2003

(54) PAINT STRIPPER FOR AIRCRAFT AND OTHER MULTICOAT SYSTEMS

(75) Inventors: James R. Machac, Jr., Lago Vista; Edward Chung-Yit Nieh, Austin; Susan A. Woodrum, Round Rock; Edward T. Marquis, Austin, all of TX (US)

(73) Assignee: Huntsman Petrochemical Corporation, Austin, TX (US)

(*) Notice: Subject to any disclaimer, the term of this patent is extended or adjusted under 35 U.S.C. 154(b) by 0 days.

(21) Appl. No.: 09/723,870

(22) Filed: Nov. 28, 2000

(51) Int. Cl.$^7$ .................................................. C11D 3/44
(52) U.S. Cl. ................ 510/202; 510/201; 510/245; 510/254; 510/255; 510/405; 510/407; 510/432; 134/38
(58) Field of Search ............... 510/201, 202, 510/245, 254, 255, 405, 407, 432; 134/38

(56) References Cited

U.S. PATENT DOCUMENTS

| | | | |
|---|---|---|---|
| 3,285,777 A | 11/1966 | Kahn et al. ............... 134/2 |
| 3,355,385 A | 11/1967 | Mackley ................ 252/104 |
| 3,843,578 A | 10/1974 | Logemann et al. ....... 524/742 |
| 3,925,008 A | 12/1975 | Makino et al. ............ 8/111 |
| 3,954,648 A | 5/1976 | Belcak et al. ........... 510/212 |
| 4,508,634 A | 4/1985 | Elepano et al. ......... 510/139 |
| 4,561,898 A | 12/1985 | Fehr et al. ............. 106/633 |
| 4,594,111 A | 6/1986 | Coonan ................. 134/3 |
| 4,780,235 A | 10/1988 | Jackson ............... 510/212 |
| 4,927,556 A | 5/1990 | Pokorny ............... 510/206 |
| 4,956,115 A | 9/1990 | Van De Mark ......... 510/206 |
| 5,006,279 A | 4/1991 | Grobbel et al. ........ 510/206 |
| 5,007,969 A | 4/1991 | Doscher ............... 510/118 |
| 5,049,300 A | 9/1991 | Fusiak et al. ......... 510/202 |
| 5,064,557 A | 11/1991 | Fusiak ................. 510/188 |
| 5,084,200 A | 1/1992 | Dishart et al. ......... 510/175 |
| 5,085,795 A | 2/1992 | Narayanan et al. ..... 510/284 |
| 5,098,591 A | 3/1992 | Stevens ............... 510/106 |
| 5,098,594 A | 3/1992 | Doscher ............... 134/1 |
| 5,106,525 A | 4/1992 | Sullivan ............... 510/206 |
| 5,124,062 A | 6/1992 | Stevens ............ 15/104.93 |
| 5,178,788 A | 1/1993 | Marquis et al. ........ 510/188 |
| 5,179,224 A | 1/1993 | Takaki et al. ......... 560/105 |
| 5,183,514 A | 2/1993 | Marquis et al. ....... 134/38 |
| 5,204,026 A | 4/1993 | Doscher-Good ....... 510/405 |
| 5,215,675 A | 6/1993 | Wilkins et al. ........ 510/206 |
| 5,236,614 A | 8/1993 | Jacquet et al. ........ 510/214 |
| 5,298,081 A | 3/1994 | Marquis ............... 134/38 |
| 5,331,103 A | 7/1994 | Constantini et al. .... 568/803 |
| 5,334,331 A | 8/1994 | Fusiak ................ 510/174 |
| 5,346,640 A * | 9/1994 | Leys .................. 252/162 |
| 5,414,153 A | 5/1995 | Constantini et al. .... 568/771 |
| 5,425,893 A * | 6/1995 | Stevens ............... 252/166 |
| 5,427,710 A | 6/1995 | Stevens ............... 134/1 |
| 5,449,474 A | 9/1995 | Lucas et al. .......... 510/407 |
| 5,518,661 A * | 5/1996 | Langford et al. ...... 252/364 |
| 5,585,526 A | 12/1996 | Constantini et al. .... 568/771 |
| 5,597,788 A | 1/1997 | Stevens ............... 510/212 |
| 5,665,690 A | 9/1997 | Lucas et al. .......... 510/407 |
| 5,721,204 A | 2/1998 | Maxwell et al. ....... 510/206 |
| 5,728,666 A | 3/1998 | Vitomir ............... 510/203 |
| 5,741,368 A | 4/1998 | Sahbari ............... 134/38 |
| 6,040,284 A * | 3/2000 | Marquis et al. ....... 510/201 |
| 6,130,192 A * | 10/2000 | Vitomir ............... 510/202 |

FOREIGN PATENT DOCUMENTS

| | | |
|---|---|---|
| EP | 0 507 426 A1 | 1/1992 |
| EP | 0 845 525 A2 | 6/1998 |
| WO | WO91/03522 | 3/1991 |
| WO | WO 93/18102 | 9/1993 |
| WO | WO 97/29158 | 8/1997 |
| WO | WO97/29158 | 8/1997 |
| WO | WO 98/53016 | 11/1998 |
| WO | WO 00/63304 | 10/2000 |

OTHER PUBLICATIONS

Database WPI, Section CH, Week 199737, Derwent Publications Ltd., London, GB: Class A35, AN 1997×399913; XP 002140069 & JP09176696A (Tonen Corp), Jul. 8, 1997–Abstract.

* cited by examiner

*Primary Examiner*—Charles Bozer
(74) *Attorney, Agent, or Firm*—Gardere Wynne Sewell LLP

(57) ABSTRACT

A composition useful as a paint remover, including alkylene carbonate such as propylene carbonate or ethylene carbonate, and an alcohol such as benzyl alcohol. Also, a process for removing paint, comprising: applying a composition containing alkylene carbonate and an alcohol to a painted surface for a time and under conditions effective to reduce adhesion between the top coats and the primer or undercoat of the paint. In another aspect, this paint remover includes dialkyl carbonate and an alcohol, optionally containing a glycol ether. In another aspect, the process includes applying a composition containing dialkyl carbonate and an alcohol. This paint remover may include a thickener, a surfactant, or a corrosion inhibitor.

11 Claims, No Drawings

PAINT STRIPPER FOR AIRCRAFT AND OTHER MULTICOAT SYSTEMS

TECHNICAL FIELD

This invention relates to compositions for paint and coating removal. More particularly, this invention relates to compositions containing an alkylene carbonate or dialkyl carbonate or both, and an alcohol.

BACKGROUND OF THE INVENTION

Paint removing compositions are commonly used in industry, such as for stripping paint from airplane fuselages. Conventional paint remover compositions include methylene chloride, phenol, or caustic. Each of these materials, however, has inherent problems during use. While methylene chloride based compositions are very effective as paint removers, methylene chloride is a highly volatile material that is considered toxic. Phenol is also highly toxic. Caustic, while not posing problems with toxicity, can burn and corrode aluminum. Additionally, methylene chloride, phenol or caustic-based strippers will attack, soften and remove all layers of paint including the primer or undercoat, making selective removal difficult.

In some applications it is desirable to be able to remove one or more layers of coating, while leaving the priming coats intact. Aircraft applications are examples of situations in which it is not desirable to remove all of the paint layers. By removing the upper coating layers while leaving the highly toxic chromium-based primer material intact, the paint removal process would generate much less hazardous waste and thus be much less costly to perform. Due to the deficiencies and disadvantages of conventional paint removing compositions, new paint removing compositions, especially those capable of selective removal, are highly desirable.

SUMMARY OF THE INVENTION

The invention is a composition useful as a paint remover, comprising alkylene carbonate and an alcohol. This composition may also contain a thickener, a surfactant, or a corrosion inhibitor.

In another broad aspect, this invention is a process for removing paint, comprising applying a composition containing alkylene carbonate and an alcohol to a painted surface for a time, and under conditions effective to cause separation of the interface between the topcoats and the primer or undercoat of the paint. The composition may also contain a thickener, a surfactant, or a corrosion inhibitor.

In another broad aspect, this invention is a process for removing paint, comprising applying a composition containing an alkylene carbonate, a dialkyl carbonate, or both and an alcohol to a painted surface for a time, and under conditions effective to reduce adhesion between the topcoats and the primer or undercoat of the paint. The composition may also contain a thickener, a surfactant, or a corrosion inhibitor.

In another broad aspect, this invention is a process for removing paint, comprising applying a composition containing a dialkyl carbonate and an alcohol to a painted surface for a time, and under conditions effective to reduce adhesion between the topcoats and the primer or undercoat of the paint. The composition may also contain a thickener.

The surfaces to be treated may be sealed with a variety of sealants, such as polysulfide, polyurethane, lacquer, epoxy, and the like. The compositions can be used to remove paints and coatings from furniture, automobiles, boats, trains, airplanes, military vehicles, and so forth.

The present invention has a number of advantages. For example, the compositions have several important attributes, including low toxicity, high efficacy in removing paint and coatings, and neutral pH (or slightly acidic or slightly basic pH). Furthermore, in the case of propylene carbonate, the propylene carbonate breaks down into propylene glycol, which is non-toxic. Thus, the propylene carbonate compositions of this invention are environmentally friendly, particularly as compared to chlorinated hydrocarbons and the like which are commonly used for paint and coating removal. In addition, the compositions of this invention reduce adhesion between the topcoats and the primer or undercoat of the paint in such a short period of time that it is envisioned that the compositions of this invention might be applied in liquid form, as opposed to the gels that are commonly used.

The compositions of the present invention have surprisingly superior paint removing properties. The compositions may be blended with additional co-solvents, corrosion inhibitors, surfactants and thickeners, or may be used directly to effect paint removal. The compositions of this invention are nonflammable, of low volatility, and free of carcinogenic chemicals.

DETAILED DESCRIPTION OF THE INVENTION

The compositions of this invention contain an alkylene carbonate or a dialkyl carbonate or both, and an alcohol.

The alkylene carbonate used in the present invention can contain from 3 to 10 carbon atoms. Representative examples of alkylene carbonates that may be employed in the practice of this invention include, but are not limited to, ethylene carbonate, propylene carbonate and butylene carbonate, but the preferred carbonate is propylene.

The dialkyl carbonate used in the present invention may contain from 3 to 25 carbon atoms. The dialkyl carbonate may be of formula R—$CO_3$—R', wherein R and R' may be the same or different, and may independently in each occurrence be an alkyl group of from 1 to about 12 carbon atoms. In one embodiment, the dialkyl carbonate may be dimethyl carbonate, diethyl carbonate, or a mixture of those two.

The compositions of this invention include an alcohol. Representative examples of such alcohols include methanol, ethanol, propanol, butanol, and benzyl alcohol, but the preferred alcohol is benzyl. Generally, compositions of this invention contain from about 0.1 to about 10 percent by weight alcohol.

In certain embodiments of this invention, the compositions contain from about 90 to about 99.9 percent by weight alkylene carbonate. In certain other embodiments of this invention, the compositions contain from about 90 to about 99.9 percent by weight dialkyl carbonate, and from about 0.01 to 10 percent alcohol.

In addition to the components described above, the compositions of this invention may optionally contain thickeners, glycol ethers such as propylene glycol methyl ether (PM), dipropylene glycol methyl ether (DPM), or dipropylene glycol n-butyl ether (DPNB), surfactants, stabilizers, corrosion inhibitors, and other additives commonly used in paint removers.

Thickeners may be used in the present invention include, but are not limited to, cellulose ethers such hydroxypropyl cellulose, ethyl cellulose, ethyl hydroxyethyl cellulose, methyl cellulose, and other alkyl or hydroxyalkyl cellulose, silica including colloidal silica, clays such as bentonite and montmorillonite starch, alumina including colloidal alumina, high molecular weight polyethylene oxides, polyvinyl pyrrolidone and methyl vinyl ether/maleic anhydride copolymers. Certain hydroxy alkyl cellulose ethers and certain experimental polymers are particularly effective and resistant to breakdown in the practice of this invention. Such cellulose ethers are available commercially from The Dow Chemical Company under the trade name Methocel® F4MPRG and Dow's Experimental Polymer SCS 41067.06. When a thickener is used, the amount of such thickener can vary depending on the desired level of thickening for the given application. In general, the amount of thickener employed is about 1 to about 4 percent by weight.

Corrosion inhibitors that may be used in the present invention include, but are not limited to, ethoxylated butynediol, petroleum sulfonates, blends of propargyl alcohol and thiourea. If used, the amount of such corrosion inhibitors is typically up to about 10% by weight of the total composition.

Surfactants which may optionally be used in the practice of this invention include, but are not limited to, non-ionic, anionic, cationic and amphoteric surfactants, such as monocarboxyl cocoimidoazoline, higher alkyl sulfate sodium salts, tridecyloxy poly(alkyleneoxy ethanol), ethoxylated or propoxylated alkyl phenol, alkyl sulfoamides, C10–18 alkylaryl sulfonates such as alkylbenzene sulfonates, cocoamphaodipropionate, hydrogenated castor oil, isooctylphenyl polyethoxy ethanol, sorbitan monopahnitate, C8–18 alkyl pyrrolidone, and cocoaminopropionic acid. When used, the amount of surfactant should be sufficient to render the composition miscible. In the context of this invention, the term "miscible solution" or "miscible composition" means a single phase solution. Typically the amount of surfactant is from about 0.1 to about 10 percent by weight of the total composition.

The compositions of the present invention may contain a wide variety of other organic co-solvents. Likewise, the present invention may be practiced in the absence of one or more of such solvents. Non-limiting examples of representative classes of such co-solvents include hydrocarbons, glycols, glycol ethers, glycol ether esters, ethers, esters, phenols, glycols, sulfur-based solvents, chlorinated hydrocarbons, aromatic hydrocarbons nitrated hydrocarbons, amides, and ketones. Such co-solvents may be polar or non-polar, may be protic or aprotic, may be cyclic, branched, or straight chain, and may contain one or more functional groups. Representative examples of common hydrocarbon solvents include hexane, toluene, xylene, and mixtures of aliphatic and aromatic hydrocarbons.

Examples of common ether co-solvents that may be used in the present invention include, but are not limited to, dibutyl ether, ethyl ether, and diphenyl ether. Representative examples of common phenols include, but are not limited to, phenol and the Cresols and resorcinols. Representative examples of common glycol solvents include, but are not limited to, ethylene, propylene and butylene glycols as well as methyl propane diol.

Examples of common sulfur-based co-solvents that can be used in the present invention include, but are not limited to, dimethylsulfoxide (DMSO) and sulfolane. Representative examples of common chlorinated hydrocarbon co-solvents include, but are not limited to, methylene chloride, methyl chloroform, chlorobenzenes and dichlorobenzenes. Representative examples of common nitrated hydrocarbon co-solvents include, but are not limited to, nitroethane and nitropropane. Representative examples of common amide co-solvents include, but are not limited to, formamide, dimethyl formamide, acetamide, and dimethylacetamide. Representative examples of common ketone co-solvents include, but are not limited to, acetone, methyl ethyl ketone (MEK), and methyl isobutyl ketone and methyl isoamylketone.

When a given composition containing dialkyl carbonate does not form a miscible composition, a co-solvent may be used to provide a miscible composition. For instance, a glycol ether may be added as a co-solvent in an amount effective to dissolve the components of the mixture. Such glycol ethers may be included for other purposes as well. Such amounts may vary depending on the specific composition of interest, as one of skill in the art may appreciate. Also, an alcohol or alkylene carbonate may be beneficially employed as a co-solvent to provide miscible dialkyl carbonate compositions of this invention.

A practitioner may use the paint stripping process of this invention under a variety of conditions. Typically, one may conduct the process under ambient atmospheric conditions, although both elevated and decreased temperatures can be used. One may apply the paint remover composition by any convenient method such as dipping, spraying, or brushing the composition onto the paint surface. For resistant painted surfaces it may be desirable to apply the composition two or more times to fully separate the topcoats from the primer or undercoat of the paint. It may be desirable to use a rag, scraper, abrasive blaster, or the like to fully remove the loosened paint from the primer or undercoat after the paint remover composition has been given time to fully act. Alternatively, high-pressure water spray may be employed to remove paint and residual paint remover composition. The time required for the paint remover composition to act will vary due to a variety of factors such as temperature, paint type, paint thickness and the particular paint remover formulation being used. In general, application times are between one minute and one hour, although longer application times may be used.

The following examples are illustrative of this invention and are not intended to limit the scope of the claimed subject matter of the present invention. Unless otherwise denoted all percentages are by weight.

EXAMPLE 1

Propylene Carbonate Composition

Various compositions were prepared containing propylene carbonate, as indicated in Table 1. In Table 1, BA represents benzyl alcohol and PC represents propylene carbonate. The times listed in Table 1 refer to the contact times of the compositions with the painted surface before the pencil test was performed.

TABLE I

FORMULATIONS AND PENCIL HARDNESS TEST DATA

| Formulations | | Time | | | | |
|---|---|---|---|---|---|---|
| BA (%) | PC (%) | 30 min | 1 hr | 1.5 hr | 2 hr | 2.5 hr |
| | | Topcoat | | | | |
| 8 | 92 | H* | H* | H* | 3B | 3B |
| 5 | 95 | H* | H* | H* | 3B | 3B |
| 3 | 97 | H | H | H* | 3B | 3B |
| 2 | 98 | H | H | H* | H | H |
| 1 | 99 | H | H | H* | H | H |

TABLE I-continued

FORMULATIONS AND PENCIL HARDNESS TEST DATA

| Formulations | | Time | | | | |
|---|---|---|---|---|---|---|
| BA (%) | PC (%) | 30 min | 1 hr | 1.5 hr | 2 hr | 2.5 hr |
| | | Primer Coat | | | | |
| 8 | 92 | 3B | 3B | 3B | 3B | 3B |
| 5 | 95 | H | H | H | H | H |
| 3 | 97 | H | H | H | H | H |
| 2 | 98 | H | H | H | H | H |
| 1 | 99 | 3B | 3B | 3B | 3B | 3B |

*indicates that the topcoat separated from the intact primer coat

The compositions were applied to a standard aluminum panel having paint and coatings for military use (obtained from Scientific Material International, Inc. of Miami, Fla., Lot 96046-A2 4"×5", MIL-P-2337 primer, MIL-S-81733 Type 3 polysulfide sealant, MIL-C-83286), and allowed to sit on the panels. The propylene carbonate/benzyl alcohol compositions were surprisingly effective in reducing the adhesion between the topcoat and the primer coat.

The Pencil Hardness data indicates the ease of separation of the topcoat from the primer or undercoat. The indicated hardness, e.g. H or 3B, is the softest pencil lead that scored the surface of the topcoat under the stated conditions.

The compositions have several important attributes, including low toxicity, high efficacy in removing paint and coatings, and neutral pH (or slightly acidic or slightly basic pH). Furthermore, propylene carbonate breaks down into propylene glycol, which is nontoxic. Thus, the propylene carbonate compositions of this invention are environmentally friendly, particularly as compared to chlorinated hydrocarbons and the like which are commonly used for paint and coating removing. In addition, the compositions of this invention cause breakdown of the interface between the topcoat and the primer or undercoat in such a short period of time that the compositions of this invention can be applied in liquid form, as opposed to the gels that are commonly applied. However, on difficult to remove coatings on vertical surfaces, thickeners such as Klucel H (Hercules, Aqualon Division), Dow's Methocell® F4MPRG, or Dow's experimental polymer XCS 41067.06 may be required to obtain effective coating removal.

What is claimed is:

1. A process for removing paint, comprising: applying a composition comprising from 92 to 99 weight percent of an alkylene carbonate and from 1 to 8 weight percent of an alcohol.

2. The process recited in claim 1, wherein the alcohol is benzyl alcohol.

3. The process recited in claim 1, wherein the alkylene carbonate is propylene carbonate.

4. The process recited in claim 1, wherein the composition further comprises a surfactant.

5. The process recited in claim 1, wherein the composition further comprises an organic solvent.

6. The process recited in claim wherein the composition further comprises an corrosion inhibitor.

7. A process for removing a coating from a surface, comprising:

providing a miscible composition of from 92 to 99 weight percent of alkylene carbonate and from 1 to 8 weight percent of an alcohol;

adding a thickening agent to the miscible composition, and mixing the resulting composition to form a thickened composition;

applying the thickened composition to a coated surface having two or more layers of coating for a time sufficient and under conditions effective to separate at least one layer of coating from the remaining layers; and removing the separated coating layer and thickened composition from the surface.

8. The process recited in claim 7, wherein the coating is paint.

9. The process recited in claim 7, wherein the alkylene carbonate is propylene carbonate.

10. The process recited in claim 9, wherein the thickened composition contains about 90 to about 99.5 percent by weight propylene carbonate, and about 0.1 to about 10 percent by weight alcohol, wherein the alcohol further comprises benzyl alcohol.

11. The process recited in claim 7, wherein the surface is aluminum.

* * * * *